United States Patent Office 2,898,543
Patented Aug. 4, 1959

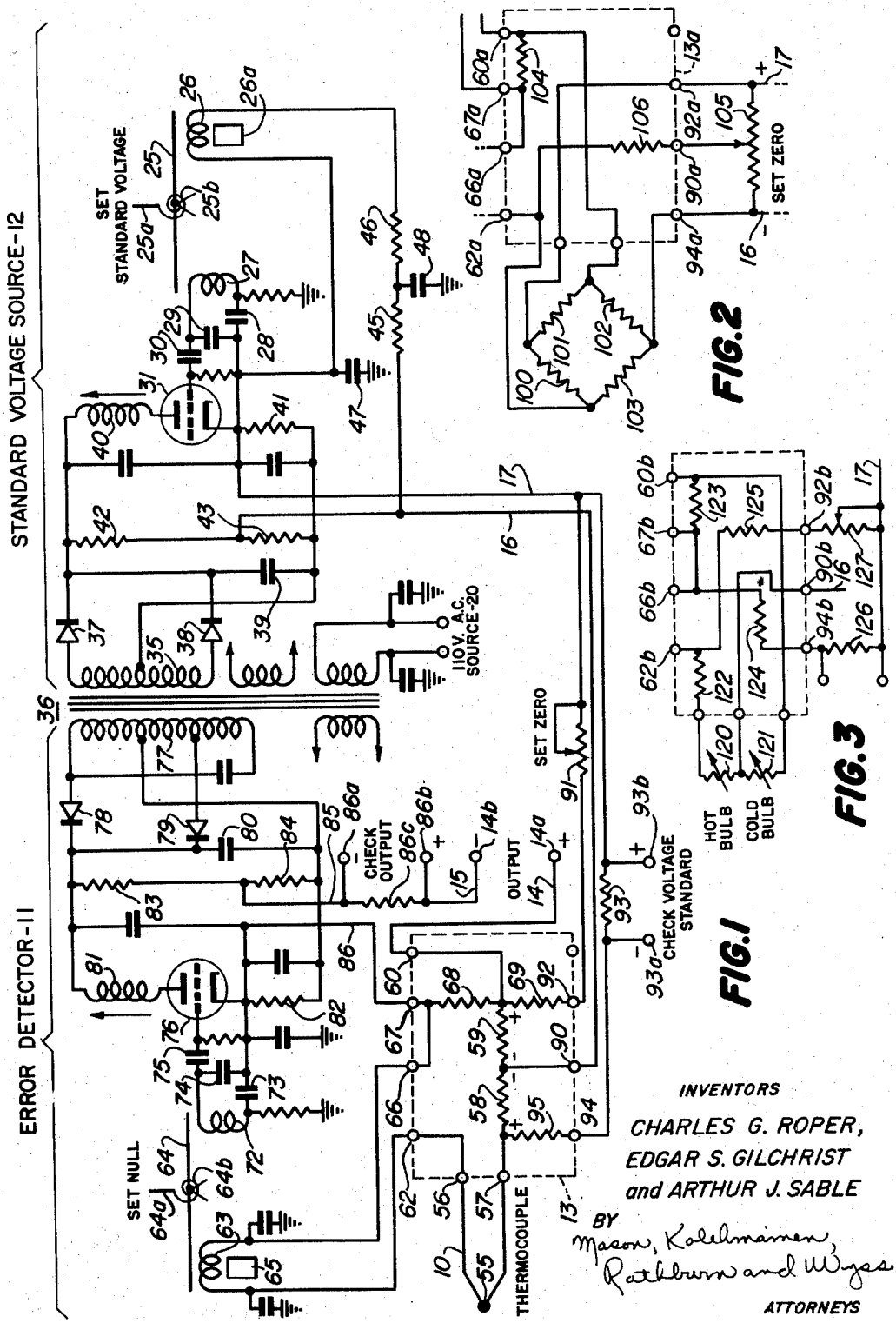

2,898,543

TRANSMITTER POTENTIOMETER

Charles G. Roper, Fairfield, Edgar S. Gilchrist, Easton, and Arthur Justin Sable, Milford, Conn., assignors to Manning, Maxwell & Moore, Inc., Stratford, Conn., a corporation of New Jersey Application April 19, 1956, Serial No. 579,194

9 Claims. (Cl. 323—64)

The present invention relates to potentiometer type measuring instruments and, more particularly, to a sensitive measuring instrument which operates on a continuous null balance principle to convert a millivolt level direct current signal into a proportional high level direct current output signal suitable for transmission to a remote point. While the invention is of general application, it is particularly suitable for measurement of thermocouple temperatures or the electrical signals from pH amplifiers, electrical gas analyzers, resistance thermometer elements, strain gauges and similar devices and is characterized by extremely high sensitivity, fast response and trouble-free operation.

While many potentiometer type measuring instruments have been developed, these arrangements have suffered from one or more disadvantages which have rendered them unsatisfactory for their intended purpose. Thus, many of these arrangements require the use of a standard cell to provide a standard reference voltage which may be connected in opposition to or compared with the unknown voltage, by using a galvanometer type measuring instrument, and exactly balanced by a voltage supplied by a separate electric circuit which is usually energized from a battery source. In many instances a slide wire potentiometer is employed to obtain such balance and difficulties arise due to improper contact of the sliding contacts on the potentiometer. Furthermore, these contacts must be cleaned periodically and the instrument calibrated and checked with the standard cell, etc. In order to minimize voltage drifts due to temperature effects and the like, some arrangements have employed voltage choppers to convert the direct current signal into an alternating current signal which may be amplified without the voltage drifts normally experienced in direct current amplifiers. However, such voltage choppers either involve mechanically moving parts or require additional circuitry to accomplish the conversion from direct current to alternating current.

It is, therefore, an object of the present invention to provide a new and improved transmitting potentiometer which is capable of converting a low level direct current signal into a proportional high level direct current output transmission signal in a simple and reliable manner.

It is another object of the present invention to provide a new and improved measuring instrument of the potentiometer type wherein no standard cell is required.

It is a further object of the present invention to provide a new and improved measuring element of the potentiometer type wherein a self-contained continuous voltage reference source of high accuracy is provided without employing standard cells.

It is another object of the present invention to provide a new and improved measuring unit of the potentiometer type wherein an accurate, stable continuous voltage reference is provided without the use of batteries and which does not require periodic standardization.

Another object of the present invention resides in the provision of a new and improved measuring unit of the potentiometer type which employs extremely simple circuitry and does not require slide wire potentiometers or voltage choppers to develop a high level direct current output transmission signal.

A further object of the present invention resides in the provision of a new and improved measuring unit of the potentiometer type which has a fast response characteristic while not requiring standard cells or a conventional battery source.

A still further object of the present invention resides in the provision of a new and improved measuring unit of the potentiometer type wherein automatic compensation for errors due to power supply variations, ambient temperature variations and transmission line resistance is provided.

The invention, both as to its organization and method of operation, together with further objects and advantages thereof, will best be understood by reference to the following specification taken in connection with the accompanying drawing in which:

Fig. 1 is a schematic diagram showing a transmitting potentiometer employing the principles of the present invention;

Fig. 2 is a schematic diagram of a portion of an alternative embodiment of the invention wherein strain gauge measurements may be made; and Fig. 3 is a schematic diagram of a further alternative embodiment of the invention wherein resistance bulb measurements may be made.

Referring now to the drawings, and more particularly to Fig. 1 thereof, the present invention is therein illustrated as comprising a thermocouple 10, an error detector indicated generally at 11, a standard voltage source 12 and a replaceable range unit or card, indicated generally at 13, the unit 13 being replaceable to provide different ranges of measurement for the instrument. Generally considered, the error detector 11 is an electromechanical force balance unit which is employed to detect the potentiometer error signal and develops a direct current output signal which may be transmitted over the conductors 14 and 15 a distance of thirty miles or more to the desired location at which the measurement signal is to be utilized. Preferably, this direct current output signal has a range of from 0.5 to 5.0 milliamperes over the desired temperature range so that the direct current output signal may be employed with suitable indicators, recorders or controllers of a control system such as described in detail in a copending application of C. G. Roper and E. S. Gilchrist, Serial No. 389,564, filed November 2, 1953, which is assigned to the same assignee as the present invention.

The standard voltage source 12 also comprises an electromechanical force balance unit which is employed to develop a stabilized, highly accurate reference voltage between the conductors 16 and 17, this reference voltage being employed in place of the conventional standard cell to provide cold junction compensation and range suppression for the desired temperature measurement, as will be described in more detail hereinafter. Both of the units 11 and 12 are energized from a conventional 110 volt A.C. source 20 which, in accordance with an important feature of the invention, need not be regulated so that conventional voltage regulating equipment is not required.

Considering first the circuit arrangement of the standard voltage source 12, a pivotally mounted beam element 25 has a feedback coil 26 mounted on one end thereof in the field of a permanent magnet 26a, the other end of the beam 25 being positioned adjacent an oscillator coil 27 so that movement of the beam produces a change in the inductance of the coil 27. A constant torque is exerted on the beam element 25 by means of a suitable mechanical input element, such as the spring 25b which may be adjusted by means of the lever 25a to vary the voltage output of the source 12. The coil 27 is connected in series with the condensers 28 and 29 which form an oscillator tank circuit the voltage of which is coupled through the condenser 30 to the control grid of an oscillator tube 31. Alternating current from the source 20 which is developed across the winding 35 of the common power transformer 36 is rectified in the rectifiers 37 and 38 to provide a unidirectional energizing potential across the filter condenser 39, this energizing potential being connected to the anode of the oscillator tube 31 through the inductive load impedance 40. The oscillator tube 31 forms one arm of a Wheatstone bridge arrangement, the cathode resistor 41 of the tube 31 forming a second arm of this bridge. A pair of resistors 42 and 43 are also connected across the energizing potential, the equalizing terminals of the above described bridge circuit being connected to the output conductors 16 and 17 of the standard voltage source 12.

In order to apply a rebalancing force to the beam 25 which will exactly balance the mechanical torque exerted on the beam by the input spring 25b and thereby provide a high degree of regulation for the output voltage developed by the unit 12, the equalizing terminals of the above described bridge circuit are also arranged to supply current to the feedback coil 26. Thus, the output conductor 16 is connected by way of the resistor 45, the resistor 46, and the feedback coil 26 to the conductor 17, the condensers 47 and 48 being connected from conductors 16 and 17 to ground to remove high frequency components from these conductors. The resistor 45 is preferably of copper and the resistor 46 is preferably of manganin, the ratio of these resistors being such that their combined temperature coefficients equals the combined temperature coefficient of the torque applying spring 25b and the permanent magnet 26a. In this connection it will be understood that the temperature coefficient of the spring 25b is in the reverse direction from that of the magnet 26a but these elements do not exactly cancel each other since the spring 25b becomes weaker with increasing temperature at a faster rate than the decreasing force produced by the magnet 26a. The resistors 45 and 46 are so chosen that complete temperature compensation is achieved and an extremely stable regulated voltage supply is provided.

From the foregoing it will be evident that when the position of the beam 25 changes, as by adjustment of the lever 25a, the inductance of the coil 27 will change with the result that the amplitude of the RF voltage developed by the oscillator tube 31 will vary and the impedance of the tube 31 also changes so as to produce an unbalance of the above described bridge circuit and a D.C. potential between the conductors 16 and 17. This D.C. output voltage flows through the coil 26 which is secured to one end of the beam 25 and since the coil 26 is positioned in the field of the magnet 26a a rebalancing force is exerted on the beam 25 such that the beam is rebalanced at a new position at which the new input force and feedback force exactly balance each other. Since a very small mechanical movement of the beam 25 is sufficient to produce a large change in output current, due to the effect of the feedback coil 26, an extremely sensitive and high gain arrangement is provided. Furthermore, in accordance with an important feature of the invention the source 12 is substantially insensitive to power supply variations, ambient temperature variations and changes due to deterioration of the electrical circuit components in the source 12. This is because such changes which tend to produce a variation in the bridge circuit balance condition are immediately compensated by the action of the feedback coil 26 which tends to restore the original balance condition. Accordingly, there is developed between the conductors 16 and 17 a regulated D.C. voltage which may be used in place of the conventional standard cell but which does not require calibration or standardization, is completely independent of voltage fluctuations on the power line 20 and is sufficiently rugged to withstand considerably shock and vibration.

Considering now the error detector 11, the hot junction 55 of the thermocouple 10 is connected to the terminal 56 on the range card 13, the cold junction 57 of the thermocouple being connected through a cold junction compensation resistor 58 and a range suppression resistor 59 and by way of the terminal 60 to the output conductor 14 of the transmitting potentiometer. The terminal 56 is internally connected to the terminal 62 on the range card 13, the terminal 62 being in turn connected to one end of an input coil 63 which is mounted on one end of a pivotally supported beam 64, the coil 63 being mounted in the field of a permanent magnet 65. The other end of the coil 63 is connected to the terminal 66 on the range card 13, the terminal 66 being connected internally to the terminal 67 on the card 13 and both the terminals 66 and 67 being connected through the span resistor 68 to the output terminal 60 and to the junction point of the range suppression resistor 59 and a dropping resistor 69.

A portion of the beam 64 is positioned immediately adjacent an oscillator coil 72 which is connected in series with the condensers 73 and 74 to form an oscillator tank circuit, the tank circuit voltage being coupled through the condenser 75 to the control grid of an oscillator tube 76. The A.C. voltage which is developed across the winding 77 of the common power transformer 36 is rectified by means of the rectifiers 78 and 79 and is filtered by means of the condenser 80, this unidirectional energizing voltage being supplied through the load inductance 81 to the anode of the oscillator tube 76. The cathode resistor 82 of the tube 76 and a pair of resistors 83 and 84 connected in series across the energizing potential together with the oscillator tube 76 form a Wheatstone bridge network. One equalizing terminal of this bridge network is connected by way of the conductor 85 and through the resistor 86 to the output conductor 15 of the transmitting potentiometer. The other equalizing terminal of this bridge network is connected by way of the conductor 86 to the terminal 67 on the range card 13, through the span resistor 68 to the terminal 60 and hence to the output conductor 14 of the transmitting potentiometer.

In order to provide automatic cold junction compensation and range suppression the highly stabilized output voltage from the standard voltage source 12 is employed as a voltage source for the cold junction resistor 58 and the range suppression resistor 59. More particularly, the negative output conductor 16 of the voltage source 12 is connected to the terminal 90 of the range card 13 and from this terminal to the junction point of the resistors 58 and 59. The positive output conductor 16 of the voltage source 12 is connected through a zero set potentiometer 91 to the terminal 92 of the card 13, the terminal 92 being connected through the dropping resistor 69 to the right hand end of the range suppression resistor 59. The conductor 17 is also connected through the resistor 93 to the terminal 94 of the card 13, the terminal 94 being connected internally through the dropping resistor 95 to the left hand end of the cold junction compensation resistor 58. Accordingly, current flows from the conductor 17 through the resistor 93, the resistor 95 and the resistor 58 to the negative output conductor 16 so as to produce a voltage of the polarity indicated in the drawing across the resistor 58. In a similar manner current flows from the conductor 17 through the potentiometer 91, the resistor 69 and the resistor 59 to the negative output conductor 16 so as to produce a voltage of the polarity shown in the drawings across the range suppression resistor 59.

Considering now the operation of the error detector 11 in conjunction with the thermocouple 10, the standard voltage source 12 and the range card 13, the input voltage signal developed by the thermocouple 10 must first equal the algebraic sum of the compensation voltage developed across the resistor 58 and the range suppression voltage developed across the resistor 59 to actuate the error detector 11. When the thermocouple voltage exceeds the algebraic sum of the voltages across the resistors 58 and 59, current flows through the input coil 63 on the beam 64 and through the span resistor 68. However, the span resistor is also connected in the output of the error detector 11 so that a feedback current proportional to the output current flows through the span resistor 68 in the opposite direction from current flow produced in this resistor by the thermocouple input signal. Accordingly, the net voltage applied to the input coil 63 on the beam 64 is the difference between the thermocouple voltage and the output voltage developed across the span resistor 68. A change in this difference voltage, such as would be produced by a change in the thermocouple temperature, is amplified in the error detector 11 so as to produce a change in output current flow through the resistor 68 in the direction to minimize this difference so that the output current is thereby adjusted to be proportional to the input voltage. Accordingly, the thermocouple is only called upon to supply enough current to maintain the difference voltage at a level which, when amplified, yields the proper value of output current. Since the amplification within the error detector 11 is extremely high, the drain on the thermocouple is very low, on the order of one-half microampere. The suppression voltage developed across the resistor 59 is derived from the constant voltage output of the standard voltage source 12, and hence remains constant, this suppression voltage offsetting the zero by an amount sufficient to give the required range suppression. The cold junction compensation resistor 58 is a temperature sensitive resistor and since a constant current from the standard voltage source 12 flows through this resistor the voltage developed thereacross will vary with cold junction temperature. Accordingly, when the temperature in the instrument housing changes the voltage across the resistor 58 will change by an amount equal and opposite to the voltage change at the cold junction of the thermocouple 10.

In calibrating the transmitting potentiometer of the present invention, the instrument is connected to the A.C. source 20, the output terminals 14a and 15a are connected to the load circuit of the instrument, or short circuited, and the thermocouple input terminals 56 and 57 are left open circuited. An accurate high resistance voltmeter or standard cell potentiometer is then connected across the check voltage terminals 93a and 93b to measure the voltage across the resistor 93 and the set standard voltage lever 25a is adjusted so that the voltage across the resistor 93 is 1.000 volts plus or minus 0.025 volt. The voltmeter is then connected to the check output terminals 86a and 86b so as to measure the voltage across the resistor 86c and the set null lever 64a, which supplies a constant torque to the beam 64 through the spring element 64b, is adjusted so as to adjust the voltage across the resistor 86c to 0.50 volt plus or minus 0.25 volt. A variable voltage source simulating the desired thermocouple span is then connected to the input terminals 56 and 57 and the input millivoltage of this source is set to the value of the low end of the span. The set zero potentiometer 91 is then adjusted so that the voltage across the resistor 86c is 0.10 volt plus or minus 0.0025 volt. The simulated thermocouple source is then set to an input millivoltage corresponding to the high end of the desired span at which input voltage across the resistor 86c should read 1.00 volt plus or minus 0.01 volt. The voltmeter is then disconnected from the terminals 86a and 86b and the thermocouple 10 is substituted for the simulated thermocouple so that the instrument is ready for use.

By way of illustration only, the following circuit constants have been found suitable in the transmitting potentiometer of Fig. 1 of the present invention wherein a span of from six to fifty millivolts D.C. was provided; a maximum range suppression of five times span; a sensitivity of 0.003 millivolt (0.1° F.); a repeatability of 0.02 millivolt (0.6° F.); a span accuracy of plus or minus 1%; an input source resistance of 200 ohms maximum; an effective input impedance of 1,000 ohms per millivolt of span; an output current of 0.5 to 5.0 milliamperes D.C.; a maximum output load resistance of 3,000 ohms; a line voltage error of plus or minus ¼% of span for 95 to 130 volts line voltage; an ambient temperature error of plus or minus 1% of span from 40 to 125° F., including cold junction error; and a speed of response of 0.2 second for 63% response, 0.8 second for 99% response, on six millivolts span, this speed of response increasing directly with span. In this arrangement the standard voltage source 12 had by itself a stability of approximately 0.1 percent for the above temperature and line voltage variations which performance is substantially better than that of a conventional standard cell under the same conditions.

For a range of 100 to 600° F. and an iron constantan thermocouple typical circuit values are as follows:

| Resistors: | Ohms |
| --- | --- |
| 58 | 13.27 |
| 59 | 12.30 |
| 68 | 3.377 |
| 69 | 9,500 |
| 95 | 9,000 |
| 93 | 1,000 |
| 82 | 10,000 |
| 83 | 10,000 |
| 42 | 47,000 |
| 43 | 3,300 |
| 45 | 3,730 |
| 46 | 167 |
| Potentiometer 91 | 1,000 |

In Fig. 2 of the drawings there is shown an alterative embodiment wherein the transmitting potentiometer may be employed for strain gauge measurements. Referring to this figure, the strain gauge is illustrated as comprising the resistance elements 100, 101, 102 and 103 which are connected in the form of a Wheatstone bridge. The strain gauge is so arranged that the resistances 100 and 102 decrease with increase of the measured variable and the resistors 101 and 103 increase in resistance upon an increase of the measured variable. In the embodiment of Fig. 2 the range card 13a has the same output terminals as the card 13, the corresponding terminals being identified by the additional reference letter "a." It will be noted that the standard voltage from the voltage source 12 is connected by way of the conductors 16 and 17 to the terminals 92a and 94a which terminals are connected to the energizing terminals of the strain gauge bridge circuit, the equalizing terminals of this bridge circuit being connected to the terminal 62a and through the span resistor 104 to the terminal 67a, the output signal being supplied to the output terminal 60a as in Fig. 1. In addition, a zero set potentiometer 105 is connected between the conductors 16 and 17 the arm of this potentiometer being connected through the terminal 90a and through the resistor 106 to the terminal 62a so as to provide a variable energization of the bridge circuit so that this bridge circuit may be initially balanced. It will be noted that the output current from the error detector flows through the span resistor 104 in the opposite direction from that produced by flow of current produced by unbalance of the strain gauge bridge circuit so that the output current follows proportionately the input signal as described in detail above in connection with Fig. 1. In this connection it will be understood that the standard voltage source is adjusted to provide the correct voltage between the conductors 16 and 17 suitable for the recommended bridge excitation voltage of the particular strain gauge which is employed, as will be readily understood by those skilled in the art.

In Fig. 3 there is shown a further alternative embodiment wherein the transmitting potentiometer of the present invention may be employed for resistance bulb temperature measurements. Referring to this figure, the hot bulb 120 and cold bulb 121 are connected to the negative conductor 16 of the reference voltage source, the hot bulb 120 being connected in series with a resistor 122 on the range card to the input terminal 62b of the error detector and the cold bulb 121 being connected through a resistor 123 to the other input terminal 66b of the error detector. The input terminal 62b is also connected through a resistor 125 and a zero adjustment potentiometer 127 to the positive conductor 17 of the standard voltage source and the input terminal 66b of the error detector is connected through the resistor 124 and a check voltage resistor 126 to the positive conductor 17. A bridge circuit is thus established which is energized from the conductors 17, 16, the resistors 124 and 126 forming one arm of this bridge, the resistors 125 and 127 forming a second arm of this bridge, the resistor 122 and the hot bulb 120 forming a third arm of this bridge and the resistor 123 and the cold bulb 121 forming the fourth arm of this bridge.

In accordance with a further feature of the invention, the above described bridge circuit is rebalanced by connecting the output current from the error detector through a portion of one arm of the bridge. More particularly, terminals 66b and 67b are connected together so that the output current of the error detector flows through the resistor 123. An increase in resistance of resistance bulb 120, or a decrease in resistance of resistance bulb 121, such as caused by a change in temperature between the two, courses a bridge unbalance between corners 62b and 66b of the bridge, the former becoming positive with respect to the latter. The resulant increase in error detector output current, flowing through resistor 123, increases the voltage across this resistor, making point 66b more positive and restoring the bridge to balance. With this arrangement the bulbs 120 and 121 may be employed to measure any desired temperature difference and to provide the standard output signal of 0.5 to 5.0 milliamperes direct current. In a particular embodiment the resistor 123 had a value of 28.27 ohms, the resistor 122 had a value of 35.33 ohms, the resistor 124 had a value of 48,700 ohms, the resistor 125 had a value of 49,000 ohms, the range of the instrument was 0° F. to 40° F. differential temperature, the hot bulb was at a reference temperature of 212° F., and the bulbs were of nickel wire having a resistance of 504.9 ohms at 30° F. It will be understood by those skilled in the art that the substitution of a fixed resistor inside the instrument for one of the resistance bulbs will permit measurement of absolute rather than differential temperature, using a single resistance bulb. In respects other than those described above, the embodiment of Figure 3 is substantially identical to that desscribed in detail in connection with Figure 1.

While there have been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A transmitting potentiometer, comprising a first electromechanical force balance unit having an input circuit and an output circuit, a primary measuring element for developing a direct current input signal proportional to a measured variable, a span resistor in series with the output circuit of said first force balance unit, a zero suppression resistor, means connecting said primary measuring element, the input circuit of said first force balance unit, said span resistor and said suppression resistor in series circuit relation, current flow through said span resistor as a result of said input signal being in the opposite direction from said output circuit current, means including a second electromechanical force balance unit for developing a stabilized unidirectional voltage, and means for connecting said stabilized voltage to said zero suppression resistor in opposition to said input signal.

2. A transmitting potentiometer, comprising a first electromechanical force balance unit having an input circuit and an output circuit, a primary measuring element for developing a direct current input signal proportional to a measured variable, a span resistor in series with the output circuit of said first force balance unit, a zero suppression resistor, means connecting said primary measuring element, the input circuit of said first force balance unit, said span resistor and said suppression resistor in series circuit relation, current flow through said span resistor as a result of said input signal being in the opposite direction from said output circuit current, a second electromechanical force balance unit including a pivotally mounted beam, a coil mounted on said beam and positioned in a magnetic field, means for exerting a constant torque on said beam, an electrical oscillator including a coil positioned adjacent said beam and influenced by movement thereof, a bridge circuit having a pair of output terminals and including said oscillator as an element thereof, means connecting said coil to said bridge output terminals, thereby to exert a force on said beam in opposition to said constant torque, and means for connecting said bridge output terminals to said zero suppression resistor.

3. A transmitting potentiometer, comprising a first electromechanical force balance unit having an input circuit and an output circuit, a primary measuring element for developing a direct current input signal proportional to a measured variable, a span resistor in series with the output circuit of said first force balance unit, a zero suppression resistor, means connecting said primary measuring element, the input circuit of said first force balance unit, said span resistor and said suppression resistor in series circuit relation, current flow through said span resistor as a result of said input signal being in the opposite direction from said output circuit current, a second electromechanical force balance unit including a pivotally mounted beam, a coil mounted on said beam and positioned in a magnetic field, means for exerting a constant torque on said beam, an electrical oscillator including a coil positioned adjacent said beam and influenced by movement thereof, a bridge circuit having a pair of output terminals and including said oscillator as an element thereof, means connecting said coil to said bridge output terminals, thereby to exert a force on said beam in opposition to said constant torque, means for connecting said bridge output terminals to said zero suppression resistor, and means for varying said torque exerted on said beam to adjust the flow of current through said zero suppression resistor.

4. A transmitting potentiometer, comprising a first electromechanical force balance unit including a pivotally mounted beam, a first coil mounted on said beam and positioned in a magnetic field, an electrical oscillator including a second coil positioned adjacent said beam and influenced by movement thereof, a bridge circuit having a pair of output terminals and including said oscillator as an element thereof, a span resistor, a load circuit, means connecting said span resistor and said load circuit in series across said output terminals, a primary measuring element for developing a direct current input signal proportional to a measured variable, a zero suppression resistor, means connecting said primary measuring element, said first coil, said span resistor and said zero suppression resistor in series circuit relation, current flow through said span resistor due to said measuring element being in the opposite direction from current flow therethrough due to an unbalance of said bridge circuit, means including a second electromechanical force balance unit for developing a stabilized unidirectional voltage, and means for connecting said stabilized voltage to zero suppression resistor in opposition to the voltage developed by said primary measuring element.

5. A transmitting potentiometer, comprising a first electromechanical force balance unit including a pivotally mounted beam, a first coil mounted on said beam and positioned in a magnetic field, an electrical oscillator including a second coil positioned adjacent said beam and influenced by movement thereof, a bridge circuit having a pair of output terminals and including said oscillator as an element thereof, a span resistor, a load circuit, means connecting said span resistor and said load circuit in series across said output terminals, a primary measuring element for developing a direct current input signal proportional to a measured variable, a zero suppression resistor, means connecting said primary measuring element, said first coil, said span resistor and said zero suppression resistor in series circuit relation, current flow through said span resistor due to said measuring element being in the opposite direction from current flow therethrough due to an unbalance of said bridge circuit, means including a second electromechanical force balance unit for developing a stabilized unidirectional voltage, means for connecting said stabilized voltage to zero suppression resistor in opposition to the voltage developed by said primary measuring element, means for applying a constant torque to said beam, and null adjustment means for varying said applied torque.

6. A transmitting potentiometer, comprising an electromechanical force balance unit including a pivotally mounted beam, a first coil mounted on said beam and positioned in a magnetic field, an electrical oscillator including a second coil positioned adjacent said beam and influenced by movement thereof, a bridge circuit having a pair of output terminals and including said oscillator as an element thereof, a span resistor, a load circuit, means connecting said span resistor and said load circuit in series across said output terminals, a primary measuring element for developing a direct current input signal proportional to a measured variable, and means connecting said primary measuring element, said first coil, and said span resistor in series circuit relation, current flow through said span resistor due to said measuring element being in the opposite direction from current flow therethrough due to an unbalance of said bridge circuit.

7. A transmitting potentiometer, comprising an electromechanical force balance unit including a pivotally mounted beam, a first coil mounted on said beam and positioned in a magnetic field, an electrical oscillator including a second coil positioned adjacent said beam and influenced by movement thereof, a bridge circuit having a pair of output terminals and including said oscillator as an element thereof, a span resistor, a load circuit, means connecting said span resistor and said load circuit in series across said output terminals, a primary measuring element for developing a direct current input signal proportional to a measured variable, means connecting said primary measuring element, said first coil, and said span resistor in series circuit relation, current flow through said span resistor due to said measuring element being in the opposite direction from current flow therethrough due to an unbalance of said bridge circuit, means for applying a constant torque to said beam, and null adjustment means for varying said applied torque.

8. A transmitting potentiometer, comprising an electromechanical force balance unit including a pivotally mounted beam, a first coil mounted on said beam and positioned in a magnetic field, an electrical oscillator including a second coil positioned adjacent said beam and influenced by movement thereof, an output circuit for said oscillator having a pair of output terminals, a span resistor, a load circuit, means connecting said span resistor and said load circuit in series across said output terminals, a primary measuring element for developing a direct current input signal proportional to a measured variable, and means connecting said primary measuring element, said first coil, and said span resistor in series circuit relation, current flow through said span resistor due to said measuring element being in the opposite direction from current flow therethrough due to said oscillator output circuit.

9. A transmitting potentiometer, comprising an electromechanical force balance unit including a pivotally mounted beam, a first coil mounted on said beam and positioned in a magnetic field, an electrical oscillator including a second coil positioned adjacent said beam and influenced by movement thereof, an output circuit for said oscillator having a pair of output terminals, a span resistor, a load circuit, means connecting said span resistor and said load circuit in series across said output terminals, a primary measuring element for developing a direct current input signal proportional to a measured variable, means connecting said primary measuring element, said first coil, and said span resistor in series circuit relation, current flow through said span resistor due to said measuring element being in the opposite direction from current flow therethrough due to said oscillator output circuit, means for applying a constant torque to said beam, and null adjustment means for varying said applied torque.

References Cited in the file of this patent
UNITED STATES PATENTS

| | | |
|---|---|---|
| 2,085,060 | Young | June 29, 1937 |
| 2,458,731 | Rath | Jan. 11, 1949 |